(12) United States Patent
Zhang et al.

(10) Patent No.: US 9,257,699 B2
(45) Date of Patent: Feb. 9, 2016

(54) SULFUR CATHODE HOSTED IN POROUS ORGANIC POLYMERIC MATRICES

(71) Applicant: UChicago Argonne LLC, Chicago, IL (US)

(72) Inventors: Zhengcheng Zhang, Naperville, IL (US); Wei Weng, Woodridge, IL (US); Shengwen Yuan, Chicago, IL (US); Khalil Amine, Oak Brook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 338 days.

(21) Appl. No.: 13/788,866

(22) Filed: Mar. 7, 2013

(65) Prior Publication Data

US 2014/0255794 A1 Sep. 11, 2014

(51) Int. Cl.
| | |
|---|---|
| *H01M 4/36* | (2006.01) |
| *H01M 4/136* | (2010.01) |
| *H01M 4/1397* | (2010.01) |
| *H01M 4/58* | (2010.01) |
| *H01M 10/052* | (2010.01) |

(52) U.S. Cl.
CPC ............. *H01M 4/364* (2013.01); *H01M 4/136* (2013.01); *H01M 4/1397* (2013.01); *H01M 4/5815* (2013.01); *H01M 10/052* (2013.01); *Y02E 60/122* (2013.01)

(58) Field of Classification Search
CPC . H01M 10/052; H01M 4/136; H01M 4/1397; H01M 4/364; H01M 4/5815
USPC .......................................................... 429/337
See application file for complete search history.

(56) References Cited

U.S. PATENT DOCUMENTS

| | | |
|---|---|---|
| 7,695,861 B2 | 4/2010 | Kolosnitsyn et al. |
| 2005/0196672 A1 | 9/2005 | Mukherjee et al. |
| 2006/0024579 A1 | 2/2006 | Kolosnitsyn et al. |
| 2009/0053607 A1 | 2/2009 | Jeong et al. |
| 2009/0311604 A1 | 12/2009 | Nazar et al. |
| 2011/0052998 A1 | 3/2011 | Liang et al. |
| 2011/0091773 A1 | 4/2011 | Wei |
| 2011/0165466 A1 | 7/2011 | Zhamu et al. |
| 2011/0206992 A1 | 8/2011 | Campbell et al. |

OTHER PUBLICATIONS

Dawson, et al., "Nanoporous organic polymer networks", Progress in Polymer Science 37 (2012) 530-563.
Ji, et al., "A highly ordered nanostructured carbon—sulphur cathode for lithium—sulphur batteries", Nature Materials, vol. 8, Jun. 2009, 500-506.
Ji, et al., "Porous carbon nanofiber-sulfur composite electrodes for lithium/sulfur cells", Energy Environ. Sci., 2011, 4, 5053-5059.
Kaur, et al., "Porous Organic Polymers in Catalysis: Opportunities and Challenges", ACS Catal., 2011, 1, 819-835.

(Continued)

*Primary Examiner* — Jonathan Jelsma
*Assistant Examiner* — Rashid Alam
(74) *Attorney, Agent, or Firm* — Foley & Lardner LLP

(57) ABSTRACT

A composite material includes a porous organic polymer and an electrochemically active material, wherein the porous organic polymer contains a plurality of pores having a diameter of from about 0.1 nm to about 100 nm, and the electrochemically active material is disposed within the pores.

17 Claims, 9 Drawing Sheets

(56) References Cited

OTHER PUBLICATIONS

Liu, et al., "IV.C.5 Hydrogen Storage through Nanostructured Porous Organic Polymers (POPs)", Argonne National Laboratory, FY2011 Annual Progress Report; DOE Hydrogen and Fuel Cells Program, 455-458.

Xiao, et al., "A Soft Approach to Encapsulate Sulfur: Polyaniline Nanotubes for Lithium—Sulfur Batteries with Long Cycle Life", Advanced Materials, 2012, 24, 1176-1181.

Yu, et al., "Synthesis and Characterization of Core-Shell Selenium/Carbon Colloids and Hollow Carbon Capsules", Chemistry A European Journal, 2006, 12, 548-552.

Zhang, et al., "Enhancement of long stability of sulfur cathode by encapsulating sulfur into micropores of carbon spheres", Energy Environ. Sci., 2010, 3, 1531-1537.

US 9,257,699 B2

SULFUR CATHODE HOSTED IN POROUS ORGANIC POLYMERIC MATRICES

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

This technology generally relates to relates to a composite material including a porous organic polymer (POP) and an electrochemically active material, and an electrochemical cell including the same. In particular, the technology relates to cathode materials including a porous organic polymer which can be used in lithium-sulfur batteries.

BACKGROUND

Lithium-ion batteries are typically smaller, lighter, have a lower self discharge rate, a higher voltage and hold a charge much longer than other types of rechargeable batteries. Amongst other uses, lithium-ion batteries have been one of the most promising energy sources to power the next generation of vehicles. However, the energy density requirements for the desired 40-mile all-electric range are three- to five-times more than what is achievable by the current lithium ion technology. Therefore, lithium-ion battery chemistries with significantly higher energy densities need to be developed in order to provide plug-in hybrid electric vehicles (PHEVs) with a sufficient charge-depleting range.

One such battery includes the lithium-sulfur battery, which can afford a significantly higher energy density than the current lithium-ion system (i.e., lithium transition metal oxide cathode with a graphite anode). Sulfur, which is abundant, non-toxic, and inexpensive, is an ideal compound in that it has a high theoretical capacity of 1,675 mA/g. In addition, a sulfur cathode can have a high specific energy density (e.g., 2,500 watt-hour/kg (Wh/kg)) and the highly ordered lithium polysulfides can provide intrinsic overcharge protection from a redox shuttle mechanism.

However, despite these benefits, a number of issues remain for the practical application of lithium-sulfur batteries. Some of these issues include i) the capacity fading during cycling and self-discharge rates, ii) lower energy efficiency due to the internal "shuttle mechanism" especially at low charge/discharge rates, and iii) cycle life and safety risk due to the lithium metal anode.

The electrochemical reaction in the lithium-sulfur battery system proceeds according to $16Li+S_8 \rightarrow Li_2S$ via a series of lithium polysulfide intermediates ($LiS_x$, $1<x<8$). The higher order ordered lithium polysulfides ($4<x<8$) are soluble in the electrolyte, thus they can diffuse to the anode and react directly with the lithium metal anode. This side reaction forms lower order polysulfides, including the less soluble $Li_2S_2$ and $Li_2S$, which may then precipitate on the lithium anode and become non-electroactive. This loss of 'cyclable' active mass results in severe capacity fading upon cycling. On the other hand, the reversible conversion of lower ordered polysulfide to higher ordered polysulfide, and vice versa on the electrode surface, causes a redox shuttle phenomenon which can then significantly lower the columbic efficiency.

Much research has been devoted to stabilizing the sulfur cathode and improving the life and cycling performance of the lithium-sulfur battery system. Most has been aimed at maintaining the mechanical and electrical integrity thereof by constraining sulfur or lithium polysulfides within a designated framework using a host material, such as various mesoporous carbon, carbon nanotubes, carbon spheres, graphene, and graphene oxide. Such studies have shown that porous carbon materials with controlled pore diameters may have the ability to restrain the solubility and mobility of the polysulfide anions. However, such porous carbon materials have been difficult to both synthesize and to scale up as the synthetic process either requires the use of a template, with removal thereof at harsh conditions (e.g., strong base, HF, etc.), or requires calcination of small organic molecules at high temperature. See, US 2011/0052998, US 2009/0311604, and Zhang et al. *Energy Environ. Sci.* 2011, vol. 4, pp. 5053.

SUMMARY

In one aspect, a composite material is provided which includes a porous organic polymer and an electrochemically active material, wherein the porous organic polymer contains a plurality of pores having a diameter of from about 0.1 nm to about 100 nm, and the electrochemically active material is disposed within the pores.

The composite material may be employed in the cathode of an electrochemical cell. Accordingly, in another aspect, provided is an energy storage device including a cathode including the composite material disclosed herein, an anode, a separator, and an electrolyte.

In yet another aspect, a method is provided for preparing the composite material. The method may include heating a mixture of particles including an electrochemically active material and a porous organic polymer at a temperature suitable for depositing the electrochemically active material into pores in the porous organic polymer.

DETAILED DESCRIPTION

Figure 1:
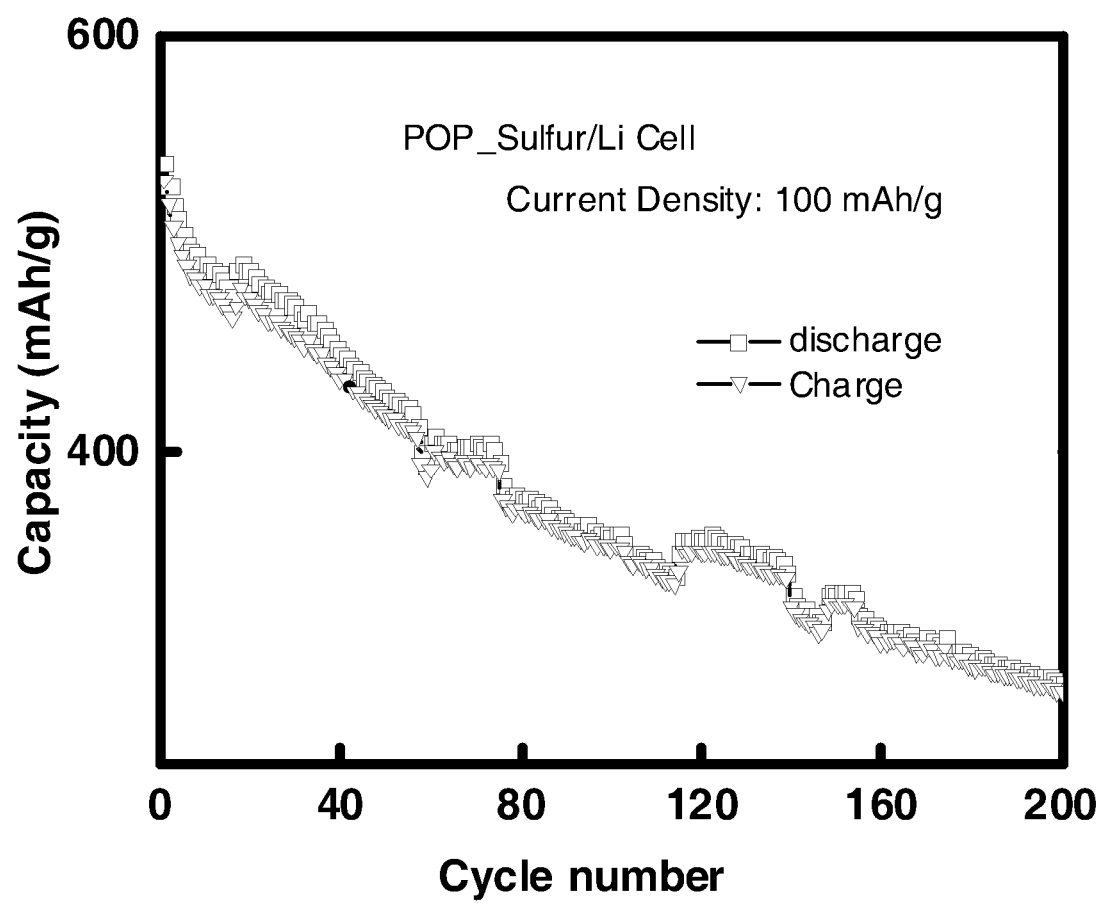
FIG. 1 is a charge-discharge capacity profile of Cell A, according to the examples.

The following terms are used throughout as defined below.

The use of the terms "a" and "an" and "the" and similar referents in the context of describing the elements (especially in the context of the following claims) are to be construed to cover both the singular and the plural, unless otherwise indicated herein or clearly contradicted by context. The terms "including," "having," "including," and "containing" are to be construed as open-ended terms (i.e., meaning "including, but not limited to,") unless otherwise noted. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally the phrase "consisting essentially of" will be understood to include those elements specifically recited and those additional elements that do not materially affect the basic and novel characteristics of the claimed invention. The phrase "consisting of" excludes any element not specifically specified.

The phrase "porous organic polymer" refers to a three dimensional polymer network having permanent microporosity formed by covalently crosslinking select monomeric units using various condensation and coupling reactions. The average diameter of the pores of the porous organic polymer are between about 0.1 nm and 100 nm and the BET surface area is greater than about 50 $m^2/g$, typically between about 300 and 5,000 $m^2/g$. The porous organic polymer can be crystalline or amorphous. Methods for synthesizing porous organic polymers are known in the art (see, for example, Dawson et al. in Progress in Polymer Science, 2012, 37, 530-563). The porous organic polymers used herein are comprised of at least one monomeric unit having a connectivity of greater than two (a node), with or without at least one monomeric unit having a connectivity of two (a strut).

The term "separator" refers to a porous or ion-conducting barrier used to separate the anode and the cathode.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

The term "alkyl" refers to alkyl groups that do not contain heteroatoms. Thus the phrase includes straight chain alkyl groups such as methyl, ethyl, propyl, butyl, pentyl, hexyl, heptyl, octyl, nonyl, decyl, undecyl, dodecyl and the like. The phrase also includes branched chain isomers of straight chain alkyl groups, including but not limited to, the following which are provided by way of example: —$CH(CH_3)_2$, —$CH(CH_3)(CH_2CH_3)$, —$CH(CH_2CH_3)_2$, —$C(CH_3)_3$, —$C(CH_2CH_3)_3$, —$CH_2CH(CH_3)_2$, —$CH_2CH(CH_3)(CH_2CH_3)$, —$CH_2CH(CH_2CH_3)_2$, —$CH_2C(CH_3)_3$, —$CH_2C(CH_2CH_3)_3$, —$CH(CH_3)CH(CH_3)(CH_2CH_3)$, —$CH_2CH_2CH(CH_3)_2$, —$CH_2CH_2CH(CH_3)(CH_2CH_3)$, —$CH_2CH_2CH(CH_2CH_3)_2$, —$CH_2CH_2C(CH_3)_3$, —$CH_2CH_2C(CH_2CH_3)_3$, —$CH(CH_3)CH_2CH(CH_3)_2$, —$CH(CH_3)CH(CH_3)CH(CH_3)_2$, —$CH(CH_2CH_3)CH(CH_3)CH(CH_3)(CH_2CH_3)$, and others. The phrase also includes cyclic alkyl groups such as cyclopropyl, cyclobutyl, cyclopentyl, cyclohexyl, cycloheptyl, and cyclooctyl and such rings substituted with straight and branched chain alkyl groups as defined above. The phrase also includes polycyclic alkyl groups such as, but not limited to, adamantyl, norbornyl, and bicyclo[2.2.2]octyl and such rings substituted with straight and branched chain alkyl groups as defined above. Thus, the alkyl groups include primary alkyl groups, secondary alkyl groups, and tertiary alkyl groups. Alkyl groups may be bonded to one or more carbon atom(s), oxygen atom(s), nitrogen atom(s), and/or sulfur atom(s) in the parent compound. Typically, alkyl groups include straight and branched chain alkyl groups and cyclic alkyl groups having 1 to 20 carbon atoms and can have from 1 to 10 carbon atoms. Even more typically, such groups, also known as lower alkyl groups, have from 1 to 5 carbon atoms. Other embodiments of alkyl groups include straight and branched chain alkyl groups having from 1 to 3 carbon atoms and include methyl, ethyl, propyl, and —$CH(CH_3)_2$. An alkyl group in which the open valence is filled by hydrogen is an alkane. Thus, alkanes include but are not limited to isobutane, pentane, hexane, octane, isooctane, and others. Alkyl groups may be substituted in which one or more bonds to a carbon(s) or hydrogen(s) are replaced by a bond to non-hydrogen and non-carbon atoms such as, but not limited to, a halogen atom in halides such as F, Cl, Br, and I; an oxygen atom in groups such as hydroxyl groups, alkoxy groups, aryloxy groups, and ester groups; a sulfur atom in groups such as thiol groups, alkyl and aryl sulfide groups, sulfone groups, sulfonyl groups, and sulfoxide groups; a nitrogen atom in groups such as amines, amides, alkylamines, dialkylamines, arylamines, alkylarylamines, diarylamines, N-oxides, imides, and enamines; a silicon atom in groups such as in trialkylsilyl groups, dialkylarylsilyl groups, alkyldiarylsilyl groups, and triarylsilyl groups; and other heteroatoms in various other groups. Substituted alkyl groups also include groups in which one or more bonds to a carbon(s) or hydrogen(s) atom is replaced by a bond to a heteroatom such as oxygen in carbonyl, carboxyl, and ester groups; nitrogen in groups such as imines, oximes, hydrazones, and nitriles. Still other substituted alkyl groups include alkyl groups that have an amine, alkylamine, dialkylamine, arylamine, (alkyl)(aryl)amine, diarylamine, heterocyclylamine, (alkyl)(heterocyclyl)amine, (aryl)(heterocyclyl)amine, or diheterocyclylamine group. A substituted alkyl group in which the open valence is filled by hydrogen is a substituted alkane. Thus, substituted alkanes include but are not limited to ethanol, ethylamine, propylamine and others.

"Aryl" groups are those that are aromatic as are well understood in the art. Aryl groups include, but are not limited to, groups such as phenyl, biphenyl, anthracenyl, and naphthenyl, by way of example. A typical unsubstituted aryl group is phenyl. Aryl groups may be bonded to one or more carbon atom(s), oxygen atom(s), nitrogen atom(s), and/or sulfur atom(s) in the parent compound. Aryl groups may be substituted.

"Alkenyl" refers to straight and branched chain and cyclic groups such as those described with respect to alkyl groups as defined above, except that at least one double bond exists between two carbon atoms. Typical alkenyl groups have from 2 to 20 carbons, and can have from 2 to 10 carbons. Examples include, but are not limited to vinyl, —CH=$CH(CH_3)$, —CH=$C(CH_3)_2$, —$C(CH_3)$=$CH_2$, —$C(CH_3)$=$CH(CH_3)$, —$C(CH_2CH_3)$=$CH_2$, cyclohexenyl, cyclopentenyl, cyclohexadienyl, butadienyl, pentadienyl, and hexadienyl among others. Alkenyl groups may be substituted.

"Alkynyl" refers to straight and branched chain groups such as those described with respect to alkyl groups as defined above, except that at least one triple bond exists between two carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C (CH$_2$CH$_3$) among others. Typical unsubstituted alkynyl groups have form 2 to 20 carbons, and can have from 2 to 10 carbons. Alkynyl groups may be substituted.

"Alkylene", "alkenylene" and "alkynylene" refer to divalent alkyl, alkenyl and alkynyl groups, respectively, as defined herein.

"Heterocyclyl" or "heterocycle" refers to both aromatic and nonaromatic ring compounds including monocyclic, bicyclic, and polycyclic ring compounds containing 3 or more ring members of which one or more is a heteroatom such as, but not limited to, N, O, and S. Examples of heterocyclyl groups include, but are not limited to: unsaturated 3 to 8 membered rings containing 1 to 4 nitrogen atoms such as, but not limited to pyrrolyl, pyrrolinyl, imidazolyl, pyrazolyl, pyridinyl, dihydropyridinyl, pyrimidinyl, pyrazinyl, pyridazinyl, triazolyl (e.g. 4H-1,2,4-triazolyl, 1H-1,2,3-triazolyl, 2H-1,2,3-triazolyl etc.), tetrazolyl, (e.g. 1H-tetrazolyl, 2H tetrazolyl, etc.); saturated 3 to 8 membered rings containing 1 to 4 nitrogen atoms such as, but not limited to, pyrrolidinyl, imidazolidinyl, piperidinyl, piperazinyl; condensed unsaturated heterocyclic groups containing 1 to 4 nitrogen atoms such as, but not limited to, indolyl, isoindolyl, indolinyl, indolizinyl, benzimidazolyl, quinolyl, isoquinolyl, indazolyl, benzotriazolyl; unsaturated 3 to 8 membered rings containing 1 to 2 oxygen atoms and 1 to 3 nitrogen atoms such as, but not limited to, oxazolyl, isoxazolyl, oxadiazolyl (e.g. 1,2,4-oxadiazolyl, 1,3,4-oxadiazolyl, 1,2,5-oxadiazolyl, etc.); saturated 3 to 8 membered rings containing 1 to 2 oxygen atoms and 1 to 3 nitrogen atoms such as, but not limited to, morpholinyl; unsaturated condensed heterocyclic groups containing 1 to 2 oxygen atoms and 1 to 3 nitrogen atoms, for example, benzoxazolyl, benzoxadiazolyl, benzoxazinyl (e.g. 2H-1,4-benzoxazinyl etc.); unsaturated 3 to 8 membered rings containing 1 to 3 sulfur atoms and 1 to 3 nitrogen atoms such as, but not limited to, thiazolyl, isothiazolyl, thiadiazolyl (e.g. 1,2,3-thiadiazolyl, 1,2,4-thiadiazolyl, 1,3,4-thiadiazolyl, 1,2,5-thiadiazolyl, etc.); saturated 3 to 8 membered rings containing 1 to 2 sulfur atoms and 1 to 3 nitrogen atoms such as, but not limited to, thiazolodinyl; saturated and unsaturated 3 to 8 membered rings containing 1 to 2 sulfur atoms such as, but not limited to, thienyl, dihydrodithiinyl, dihydrodithionyl, tetrahydrothiophene, tetrahydrothiopyran; unsaturated condensed heterocyclic rings containing 1 to 2 sulfur atoms and 1 to 3 nitrogen atoms such as, but not limited to, benzothiazolyl, benzothiadiazolyl, benzothiazinyl (e.g. 2H-1,4-benzothiazinyl, etc.), dihydrobenzothiazinyl (e.g. 2H-3,4-dihydrobenzothiazinyl, etc.), unsaturated 3 to 8 membered rings containing oxygen atoms such as, but not limited to furyl; unsaturated condensed heterocyclic rings containing 1 to 2 oxygen atoms such as benzodioxolyl (e.g., 1,3-benzodioxoyl, etc.); unsaturated 3 to 8 membered rings containing an oxygen atom and 1 to 2 sulfur atoms such as, but not limited to, dihydrooxathiinyl; saturated 3 to 8 membered rings containing 1 to 2 oxygen atoms and 1 to 2 sulfur atoms such as 1,4-oxathiane; unsaturated condensed rings containing 1 to 2 sulfur atoms such as benzothienyl, benzodithiinyl; and unsaturated condensed heterocyclic rings containing an oxygen atom and 1 to 2 sulfur atoms such as benzoxathiinyl. Heterocyclyl group also include those described above in which one or more S atoms in the ring is double-bonded to one or two oxygen atoms (sulfoxides and sulfones). For example, heterocyclyl groups include tetrahydrothiophene oxide and tetrahydrothiophene 1,1-dioxide. Typical heterocyclyl groups contain 5 or 6 ring members. Thus, for example, heterocyclyl groups include morpholinyl, piperazinyl, piperidinyl, pyrrolidinyl, imidazolyl, pyrazolyl, 1,2,3-triazolyl, 1,2,4-triazolyl, tetrazolyl, thiophenyl, thiomorpholinyl, thiomorpholinyl in which the S atom of the thiomorpholinyl is bonded to one or more O atoms, pyrrolyl, pyridinyl, homopiperazinyl, oxazolidin-2-onyl, pyrrolidin-2-onyl, oxazolyl, quinuclidinyl, thiazolyl, isoxazolyl, furanyl, and tetrahydrofuranyl. Heterocyclyl or heterocycles may be substituted.

In one aspect, a composite material is provided that includes a porous organic polymer and an electrochemically active material, wherein the porous organic polymer contains a plurality of pores having a diameter of from about 0.1 nm to about 100 nm, and the electrochemically active material is disposed within at least a portion of the pores.

The porous organic polymers as used herein provide a rigid scaffold for housing the electrochemically active material and have a permanent porosity with an average pore diameter of from about 0.1 nm to about 100 nm, or from about 0.1 nm to about 50 nm, or from about 0.1 nm to about 20 nm, or from about 0.1 nm to about 10 nm, or from about 0.5 nm to about 5 nm, or from about 0.5 nm to about 2 nm. As a result of the small pore size, the porous organic polymers have a very high Brunauer-Emmett-Teller (BET) specified surface area, e.g., greater than 50 m$^2$/g, typically ranging from 300-5,000 m$^2$/g.

In contrast to polymer materials formed by templating methods, the porosity of the porous organic polymers used herein is a function of the molecular structure, where the pore size and geometry of the porous organic polymer can be controlled by selection of the composition of the building components or "monomeric units" used to make the porous organic polymer.

Typically, the porous organic polymers have at least one monomeric unit having a connectivity of greater than two (a node), with or without at least one monomeric unit having a connectivity of two (a strut). In some embodiments, the porous organic polymer comprises biphenyl groups. In certain embodiments, the porous organic polymer is non-conductive.

In some embodiments, the porous organic polymer includes one or more monomeric units represented as:

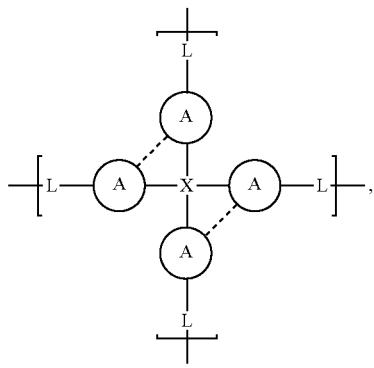

-continued

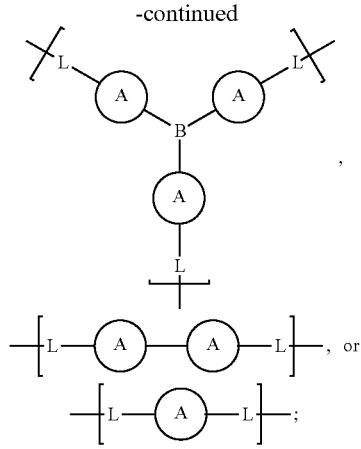

wherein each dotted line (----) is independently a bond or absent; X is C or Si; each A is independently cycloalkyl, heterocyclyl, or aryl; and each L is independently a bond, $C_1$-$C_4$ alkylene, $C_2$-$C_4$ alkenylene, or $C_2$-$C_4$ alkynylene. In some embodiments, the dotted line (----) is absent. In other embodiments, the dotted line (----) is a bond. In some embodiments, X is C. In some embodiments, A is aryl. In other embodiments, A is phenyl. In certain embodiments, A is unsubstituted phenyl. In some embodiments, L is a bond. In some embodiments, L is —CH$_2$—. In some embodiments, L is —C≡C—.

In some embodiments, the porous organic polymer is represented as:

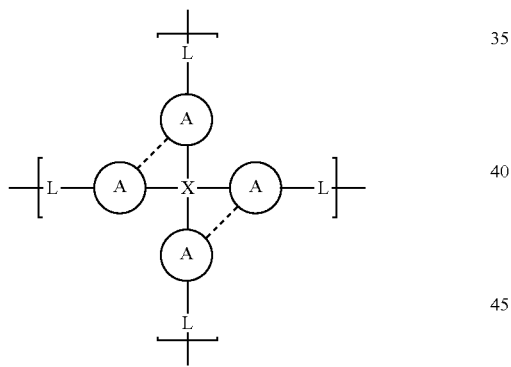

wherein each dotted line (----) is independently a bond or absent; X is C or Si; each A is independently cycloalkyl, heterocyclyl, or aryl; and each L is independently a bond, $C_1$-$C_4$ alkylene, $C_2$-$C_4$ alkenylene, or $C_2$-$C_4$ alkynylene.

In some embodiments, the porous organic polymer is represented as:

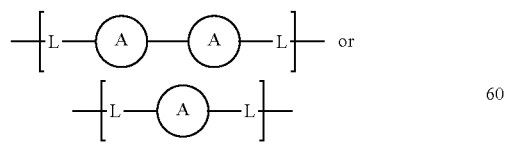

wherein each dotted line (----) is independently a bond or absent; X is C or Si; each A is independently cycloalkyl, heterocyclyl, or aryl; and each L is independently a bond, C1-C4 alkylene, $C_2$-$C_4$ alkenylene, or $C_2$-$C_4$ alkynylene.

In certain embodiments, the porous organic polymer may include one or more monomeric units represented as:

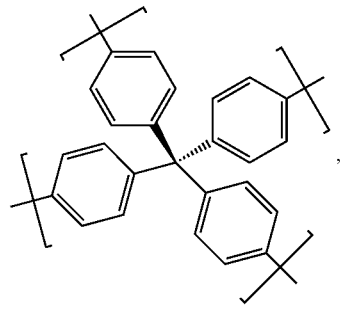

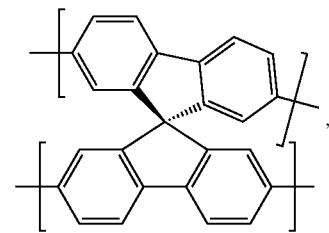

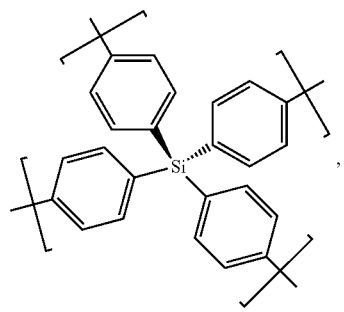

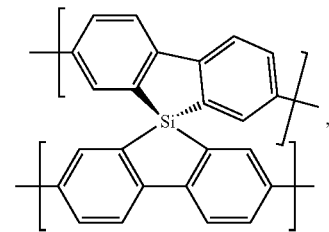

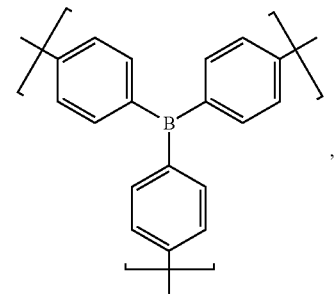

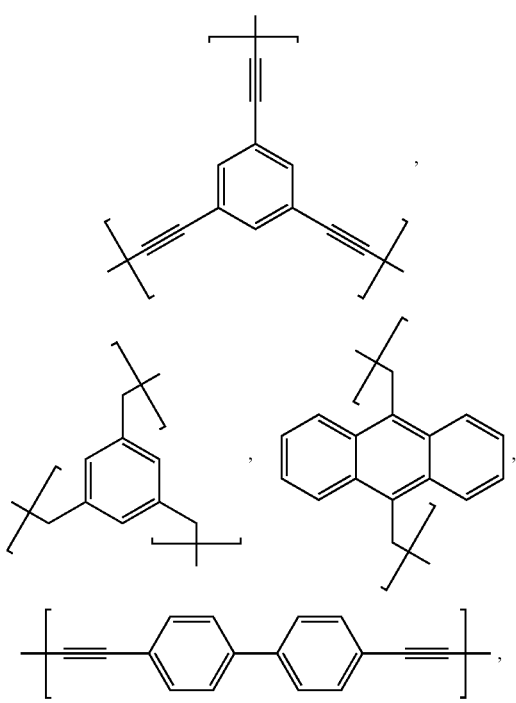

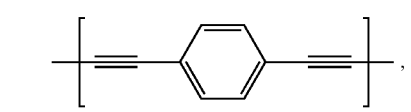

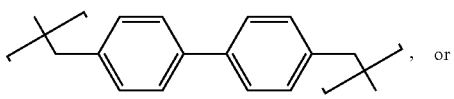

, or

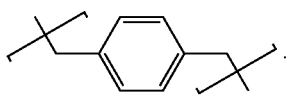

.

In certain embodiments, the porous organic polymer includes a monomeric unit represented as:

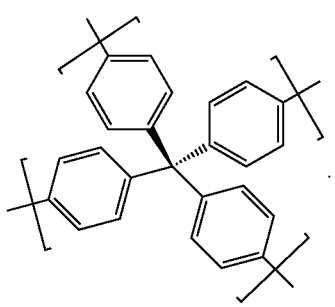

In some embodiments, the porous organic polymer, referred to as porous organic polymer B (POP-B), includes a monomeric unit, and represented as:

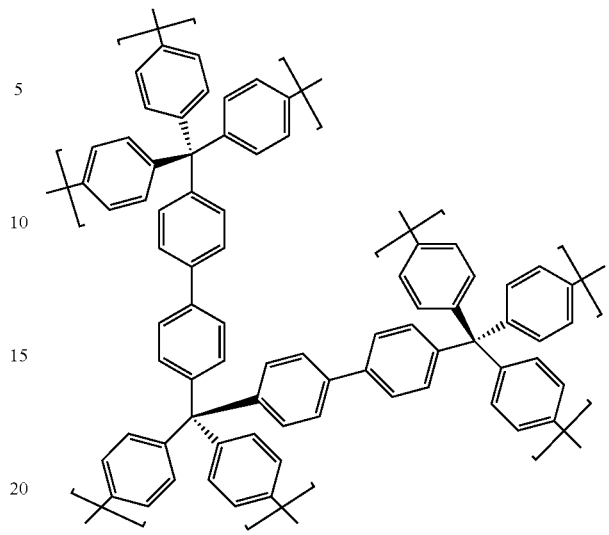

In certain embodiments, the porous organic polymer is represented as:

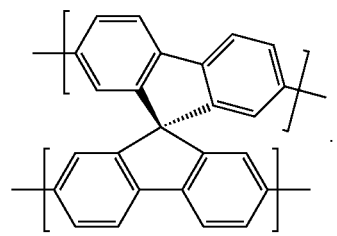

In some embodiments, the porous organic polymer, referred to as porous organic polymer C(POP-C), is represented as:

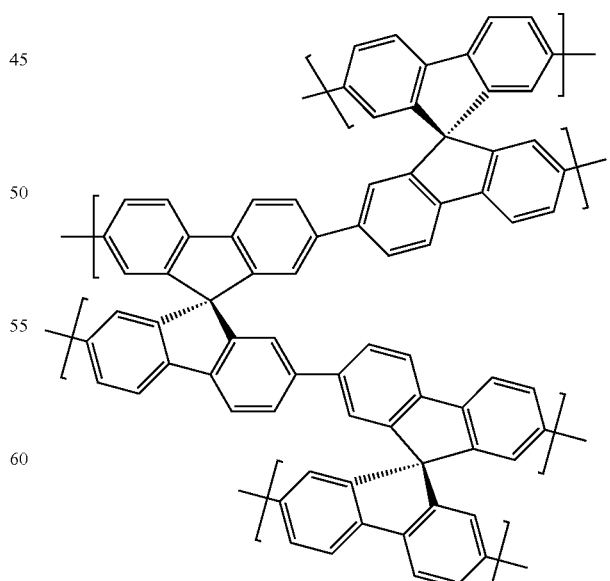

In certain embodiments, the porous organic polymer includes a monomeric unit represented as:

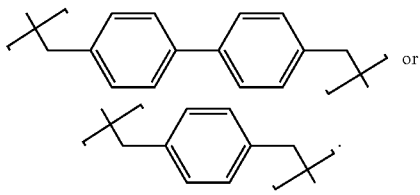

In some embodiments, the porous organic polymer, referred to as porous organic polymer A (POP-A), is represented as:

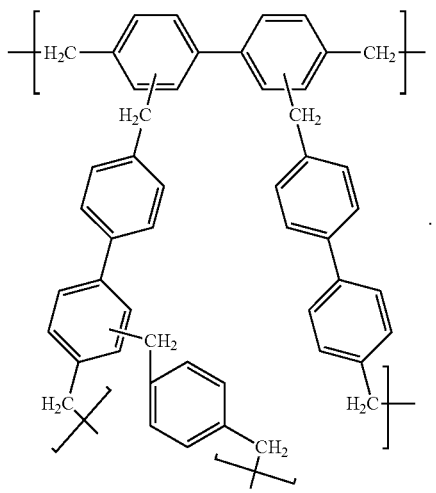

The composite material may includes a porous organic polymer as disclosed herein and an electrochemically active material. Illustrative electrochemically active materials include, but are not limited to sulfur, selenium and tellurium. In some embodiments, the electrochemically active material includes sulfur. In some embodiments, the sulfur may be in the form of elemental sulfur (i.e., $S_8$). In some embodiments, the electrochemically active material may be $Li_2S_x$ or $Li_2Se_x$, where x designated the polymeric nature of the sulfide or selenide.

The electrochemically active material may be present in the composite material in an amount from about 10 wt % to about 100 wt %. This includes amounts from about 20 wt % to about 90 wt %, from about 20 wt % to about 80 wt %, or from about 20 wt % to about 60 wt %.

The composite material may also include conductive carbon. Conductive carbon may include, but is not limited to, microporous carbon, mesoporous carbon, mesoporous microbeads, graphite, expandable graphite, graphene, carbon black, or carbon nanotubes, which are well know in the art and can be obtained via known methods or commercial sources. For example, commercial sources for carbon black include Super P, Black Pearl 2000, Denka Black, Vulcan XC72R, and Ketjen black.

The composite material may be employed in the cathode of an electrochemical cell. Accordingly, disclosed herein is an energy storage device including a cathode including the composite material disclosed herein, an anode, a separator, and an electrolyte.

The cathode of the energy storage device may be a composite material as disclosed herein, wherein the composite material includes a porous organic polymer having a plurality of pores with a diameter of from about 0.1 nm to about 100 nm, and an electrochemically active material disposed within at least a portion of the pores. The porous organic polymer acts as a molecular container or physical barrier which stabilizes the electrochemical performance of the cathode materials. This stability is accomplished by utilizing the intrinsic pores of the porous organic polymer to contain the electrode materials, acting as a barrier to avoid the leaching of active mass into electrolyte solutions. The flexible porous organic polymer structure is also able to accommodate the volume expansion observed during the lithiation/de-lithiation process while maintaining the mechanic integrity of the particles.

In some embodiments, the anode of the energy storage device includes lithium metal, lithiated silicon, lithiated tin, or lithiated graphite. However, it is contemplated that the anode of the energy storage device can comprise any suitable material. For example, silicon anodes have very high theoretical capacity of 4,200 mA/g and low lithium insertion voltage, and are thus contemplated in the energy storage devices disclosed herein. Additional suitable materials include, but are not limited to, nanomaterials of other intermetallic metals or metal oxides such as those including one or more of Si, Sn, Bi, $SnO_2$, $FeO_x$, $Co_3O_4$, NiO, $Mn_3O_4$, $SiO_x$. Each of these elements or oxides thereof can usually accommodate more than one lithium atom during alloying process to achieve high theoretical capacity. However, the lithium insertion into silicon or a metal oxide results in a large volume expansion up to 400% accompanied by significant mechanical stress. This is known to fracture the electrode and cause drastic capacity fade. It has thus become common to stabilize the anode by embedding the Si, Sn or metal oxide into a nanostructured carbon template (i.e. porous carbon, graphene). Accordingly, it is further contemplated that the anode comprises a porous organic polymer to accommodate this volume change and enhance the stability of the anode.

The electrodes (i.e., the cathode and/or the anode) may also include a conductive polymer. Illustrative conductive polymers include, but are not limited to, polyaniline, polypyrrole, poly(pyrrole-co-aniline), polyphenylene, polythiophene, polyacetylene, polysiloxane, or polyfluorene.

The energy storage devices may also include a separator to separate the cathode from the anode and prevent, or at least minimize, short-circuiting in the device. The separator may be a polymer or ceramic separator. For example, the separator may include, but is not limited to, polypropylene (PP), polyethylene (PE), trilayer (PP/PE/PP), or polymer films that may optionally be coated with alumina-based ceramic particles.

As noted above, the electrochemical cell also includes an electrolyte. Suitable electrolytes include a solvent and a salt. The salt may include alkali metal salts in general, and lithium metal salts in some specific embodiments. Suitable salts include those such as, but not limited to, $LiPF_6$, $LiClO_4$, $Li[B(C_2O_4)_2]$, $Li[BC_2O_4F_2]$, $Li[PF_4(C_2O_4)]$, $Li[N(CF_3SO_2)_2]$, $Li[C(SO_2CF_3)_3]$, $Li[N(C_2F_5SO_2)_2]$, $LiCF_3SO_3$, $Li_2B_{12}X_{12-n}H_n$, $Li_2B_{10}X_{10-n'}H_{n'}$, where X is a halogen, n is an integer from 0 to 12, and n' is an integer from 0 to 10, $LiAlF_4$, $LiBF_4$, $Li(FSO_2)_2N$, $Li_2SO_4$, $LiAlO_2$ LiSCN, LiBr, LiI, $LiAsF_6$, $LiB(Ph)_4$, $LiSO_3CH_3$, $Li_2S_{x''}$, $Li_2Se_{x''}$, $(LiS_{x''}R)_y$ or $(LiSe_{x''}R)_y$; wherein x" is an integer from 1 to 20, y is an integer from 1 to 3 and R is H, alkyl, alkenyl, aryl, ether, F, $CF_3$, $COCF_3$, $SO_2CF_3$, or $SO_2F$.

The solvents for use in the electrolyte may include, but are not limited to, a fluorinated ether solvent, a cyclic ether, a siloxyl ether solvent, a silyl carbonate solvent, or a siloxyl carbonate solvent. In some embodiments, the solvent is a mixture of a fluorinated and a cyclic ether. For example, the solvent may be a mixture of a fluorinated solvent and 1,3- dioxolane, or a fluorinated solvent and tetrahydrofuran, or a fluorinated solvent and a pyran, or a fluorinated solvent and a dioxane. In certain embodiments, the electrolyte includes lithium bis(trifluoromethanesulfonyl)imide.

In one embodiment, the solvent is a fluorinated ether solvent. In some embodiments, the fluorinated ether solvent is represented by Formula I or II:

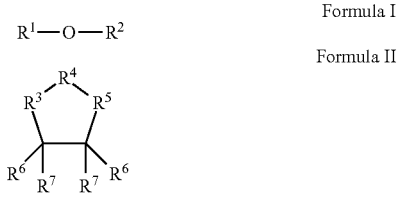

wherein: $R^1$ and $R^2$ are individually a $C_nH_xF_y$ group; $R^3$ and $R^5$ are individually O or $CR^6R^7$; $R^4$ is O or C=O; each $R^6$ and $R^7$ is individually H, F or a $C_nH_xF_y$ group; each x is individually from 0 to 2 n; each y is individually from 1 to 2n+1; and each n is individually an integer from 1 to 20; with the proviso that at least one $R^6$ or $R^7$ is other than H, and $R^4$ is not O when $R^3$ or $R^5$ is O.

In certain embodiments, the fluorinated ether solvent is represented by Formula I, and $R^1$ and $R^2$ are individually $CF_2CF_3$; $CF_2CHF_2$; $CF_2CH_2F$; $CF_2CH_3$; $CF_2CF_2CF_3$; $CF_2CF_2CHF_2$; $CF_2CF_2CH_2F$; $CF_2CF_2CH_3$; $CF_2CF_2CF_2CF_3$; $CF_2CF_2CF_2CHF_2$; $CF_2CF_2CF_2CH_2F$; $CF_2CF_2CF_2CH_3$; $CF_2CF_2CF_2CF_2CF_3$; $CF_2CF_2CF_2CF_2CHF_2$; $CF_2CF_2CF_2CF_2CH_2F$; $CF_2CF_2CF_2CF_2CH_3$; or $CF_2CF_2OCF_3$.

In certain embodiments, the fluorinated ether solvent is $CHF_2CF_2OCF_2CF_2CF_2H$; $CF_3CF_2OCF_2CF_3$; $CF_3CF_2CF_2OCF_2CF_2CF_3$; $CF_3CF_2CF_2CF_2OCF_2CF_2CF_2CF_3$; $CF_3OCF_2CF_2OCF_2CF_2CF_3$; $CF_3CF_2OCF_2CH_2F$;

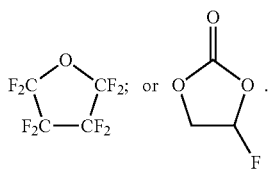

In another aspect, a method for preparing the composite material is provided. The method includes heating a mixture of particles including an electrochemically active material and a porous organic polymer at a temperature suitable for depositing the electrochemically active material into pores in the porous organic polymer.

It will be appreciated that the electrochemically active material and the porous organic polymer can be mixed and formed into particles using a variety of methods, including ball milling, grinding, melting evaporation, and/or vacuum treatment. In one aspect, the composite material is prepared from ball milling the mixture of sulfur and porous organic polymer in bulk or in a liquid medium (e.g., in a solvent such as methanol, ethanol, isopropanol, acetone, dimethylformamide (DMF), dimethylsulfoxide (DMSO), carbon disulfide, toluene, benzene, carbon tetrachloride) and then heat the mixture to an appropriate temperature. In those embodiments where the composite material also includes conductive carbon, the composite material may be provided by mixing (e.g., ball milling) a mixture of electrochemically active material (e.g., sulfur), porous organic polymer and conductive carbon in bulk or in an a liquid medium and then heating the mixture to an appropriate temperature. The amount of conductive carbon can vary, and is typically added in an amount ranging from about 1% to about 50% by weight relative to the total weight of electrochemically active material and porous organic polymer, or from about 5% to about 50%, or from about 10% to about 40%, or from about 20% to about 40%, or about 35%.

The size of the particles should be such that the electrochemically active material is at least partially disposed into pores in the porous organic polymer. The particle size of the electrochemically active material is, on average, less than about 100 nm. For example, the particle size of the electrochemically active material may be less than about 80 nm, or less than about 50 nm, or less than about 20 nm, or less than about 10 nm, or less than about 2 nm. The electrochemically active material is typically used in a sufficient amount such that the electrochemically active material is present in the composite material in an amount from about 10 wt % to about 100 wt %. This includes amount from about 20 wt % to about 90 wt %, or from about 20 wt % to about 80 wt %, or from about 20 wt % to about 60 wt %.

The heating can be conducted at any suitable temperature, including up to or greater than the melting point or the vapor point of the electrochemically active material and may performed under atmospheric or negative pressure. In some embodiments, the temperature is about 150° C. and above. The heating may be performed under inert conditions (i.e., an inert atmosphere). Illustrative inert atmospheres include, but are not limited to, He, Ar, or $N_2$. However, under such conditions, positive or negative pressure may also be employed. In other embodiments, the heating is performed under reducing conditions to avoid or prevent oxidation of the electrochemically active material or the porous organic polymer. The reducing conditions comprise a gas, such as, but not limited to, $N_2$, $H_2$, CO, or HS, either neat or in mixture with an inert gas as described above. The reducing conditions can also include positive or negative pressure. In some embodiments, the reducing gas includes hydrogen at a concentration from about 0.1 vol % to about 5 vol % in an inert gas.

After the composite material is prepared, the electrochemically active material may be partially removed from the pores of the porous organic polymer by heating. When sulfur is used as the electrochemically active material, temperatures of about 150° C. are employed, and in some cases, under vacuum. Similar results will be understood to apply to Se and Te, at a temperature consistent with such other elements. For example, at about 175° C. under vacuum for Se and 400° C. under vacuum for Te. This additional heating (either by conducting the insertion at various temperatures, or post-processing the composite material at an appropriate temperature) provides for optimization of the electrochemically active material content in the porous organic polymer. For example, where sulfur is driven into the pores of the polymer (i.e., disposed) at 150° C., the loading of the sulfur in the composite material may range from about 20 wt % to about 80 wt %. By heating the sulfur-containing composite material at various temperatures and for various time periods, some of the sulfur may be removed from the porous organic polymer to adjust the sulfur loading. Long periods of time at the same temperature will remove more sulfur, and higher temperature and higher vacuum will remove move additional sulfur, or remove the sulfur at a faster rate.

The composite material may then be prepared in a slurry with a binder and applied to a current collector for formation of a cathode. The current collector provides contact between the composite material and an external load to allow for the flow of electrons through a circuit to which the electrode is connected. The current collector may be any suitable conductive material. Illustrative current collectors include, but are not limited to, metals such as aluminum, nickel, platinum, palladium, gold, silver, copper, iron, stainless steel, rhodium, manganese, vanadium, titanium, or tungsten, or any such carbon-coated metal.

To form the slurry of the composite material with a binder, the binder is dissolved in a solvent and slurried with the composite material, prior to application to the current collector and solvent removal. Illustrative binders include, but are not limited to, polyvinylidene difluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), alginate, gelatine, a copolymer of any two or more such polymers, or a blend of any two or more such polymers. In one embodiment, the binder is alginate. Suitable solvents include, but are not limited to water, N-methylpyrrolidone (NMP), acetone, toluene, dimethylformamide (DMF), and dimethylsulfoxide (DMSO), as well as mixtures of any two or more such solvents.

Batteries including such a cathode including the composite material disclosed herein can be fabricated using an anode, a separator, and an electrolyte using methods known to those of skill in the art.

The present invention, thus generally described, will be understood more readily by reference to the following examples, which are provided by way of illustration and are not intended to be limiting of the present invention.

EXAMPLES

Example 1

Preparation of POP-A

To a dry, 2-neck flask was added anhydrous 1,2-dichloroethane (60 mL) and anhydrous iron trichloride. Heating was applied to dissolve the iron trichloride, and then it was cooled to room temperature. To another, dry, round bottom flask was added anhydrous 1,2-dichloroethane (80 mL), 1,4-bis(chloromethyl)benzene (1.751 g), and 4,4'-bis(chloromethyl)biphenyl (7.535 g), and the mixture was stirred to obtain a clear solution. The resultant solution was then transferred via cannula to the iron trichloride solution with stirring. The reaction mixture was heated to 80° C. over a 30 minute period and heating was continued at 80° C. for 18 hours. Upon cooling to room temperature, methanol (300 mL) was added and the reaction was stirred for an additional 2 hours, followed by filtration collection of the solid product. The solid product was stirred into methanol (200-300 mL) for another 2 hours, and was filtered. The resulting solid was further washed with water and methanol, and dried in a vacuum oven at 80° C. overnight. The product (POP-A) polymer was a brown powder, about 70% of the monomers weight (see FIG. 1).

Example 2

Preparation of POP-B

Anhydrous dimethylformamide was prepared by drying dimethylformamide over calcium hydride, followed by distilling and degassing with argon for 30 minutes. Nickel bis(cyclooctadiene) (1.754 g) and 2,2'-bipyridyl (1.0 g) were added to a 2-neck flask under inert atmosphere, along with cyclooctadiene (0.82 mL) and anhydrous dimethylformamide (80 mL) via cannula. The mixture was heated at 80-85° C. for about 1 hour to obtain a dark purple solution. Tetrakis (4-bromophenyl)methane (0.78 g) was added to a separate flask along with anhydrous dimethylformamide (30 mL). The mixture was gently heated to obtain a clear solution. Both of above solutions were cooled to room temperature, and then the solution of tetrakis(4-bromophenyl)methane was added to the other flask via cannula, with stirring. The reaction mixture was heated at 75° C. overnight. After cooling to room temperature, concentrated HCl (20 ml) was slowly added while stirring. Stirring was continued for about 2 hours. The solid was collected by filtration, and triturated with chloroform and tetrahydrofuran (5 times with each solvent). About 0.4 g of the product (POP-B) was obtained as an off-white, polymer solid powder, after drying in a vacuum oven at 80° C. for 12 hours (see FIG. 1).

Example 3

Preparation of POP-C

Nickel bis(cyclooctadiene) (1.754 g) and 2,2'-bipyridyl (1.0 g) were added to a 2-neck flask under inert atmosphere, along with cyclooctadiene (0.82 mL) and anhydrous dimethylformamide (80 mL). The mixture was heated at 80-85° C. for about 1 hour to obtain a dark purple solution. 2,2',7,7'-Tetrabromo-9,9'-spirobifluorene (0.77 g) was then dissolved in anhydrous dimethylformamide (30 mL) in a separate flask. The nickel mixture was cooled to room temperature, at which time the solution of 2,2',7,7'-tetrabromo-9,9'-spirobifluorene was added via cannula while stirring. The reaction mixture was then heated to 75° C. overnight. After cooling to room temperature, concentrated HCl (20 ml) was slowly added while stirring. Stirring was continued for about 2 hours. The solid was collected by filtration and triturated with chloroform and tetrahydrofuran (5 times with each solvent). About 0.4 g of product (POP-C) was obtained as a light yellow polymer solid, after drying in a vacuum oven at 80° C. for 12 hours (see FIG. 1).

Example 4

Preparation of POP-B Sulfur Composite

Method A

Solid composite materials were prepared by ball-milling POP-B polymer (0.5 g) with solid sulfur (0.5 g) at room temperature for 12 hours. The obtained powder was transferred to a Parr reactor and sealed under Ar. The reactor was heated in furnace at 150° C. for 12 hours.

Example 5

Preparation of POP-B Sulfur Composite

Method B

Solid composite materials were prepared by ball-milling POP-B polymer (0.5 g) with sulfur solid (0.5 g) dispersed in ethanol (2 ml) at room temperature for 12 hours. The obtained powder was filtered and dried at 50° C. under vacuum for 2 hours before transferring to a Parr reactor and sealed under Ar. The reactor was heated in furnace at 150° C. for 12 hours.

Example 6

Preparation of POP-B Sulfur Composite

Method C

Solid composite materials were directly prepared by ball-milling POP-B polymer (0.5 g) with sulfur solid (0.5 g) for 12 hours.

Example 7

Preparation of POP-B/Sulfur/Carbon Composite

Method D

Solid composite materials were prepared by ball-milling POP-B polymer (0.5 g) with sulfur solid (0.5 g) and conductive carbon (0.7 g) for 12 hours. The obtained powder was transferred to a parr reactor and sealed under Ar. The reactor was heated in a furnace at 150° C. for 12 h.

Example 8

Preparation of POP-B/Sulfur/Carbon Composite

Method E

Solid composite materials were directly prepared by ball-milling POP-B polymer (0.5 g) with sulfur solid (0.5 g) and conductive carbon (0.7 g) for 12 hours.

Other solid composite materials were prepared using POP-A and POP-C by the methods described hereinabove. Upon addition of sulfur to the POPs, the Brunauer-Emmett-Teller (BET) surface area is dramatically reduced (Table 1). This shows the effectiveness of the sulfur addition to near full capacity. The significant decrease of the BET surface area suggests that the pore has been at least partially blocked by sulfur particles.

TABLE 1

BET surface change before and after sulfur embedding.

| | POP-A | POP-B | POP-C |
|---|---|---|---|
| BET ($m^2/g$) | 1362 | 3142 | 1627 |
| BET after sulfur addition ($m^2/g$) | 104 | 63 | 31 |

Example 11

Cell Fabrication

Cathodes were fabricated using a slurry containing 50% POP-Sulfur composite, 35% conductive carbon (Super P), and 15% binder (PVDF; polyvinylidenedifluoride). The slurry was coated on aluminum foil using an automatic film coater with vacuum chuck and dried at 75° C. The cathodes were then used to prepare coin half-cells with an electrolyte of dioxolane (DOL) and $CHF_2CF_2CH_2OCF_2CF_2H$ (D2) in a 1:2 volume ratio, respectively, and with lithium bis(trifluoromethanesulfonyl)imide at 1 molar as a salt. All testing was conducted at a current of 100 mA/g, over a voltage range of 1.5-3 volts (except for FIG. 9 at 200 mA/g). Specific examples of electrochemical cells are as follows. The performance results thereof are shown in FIGS. 1-9.

Cell A: POP-A and sulfur were mixed via grinding in an agate mortar, then heated to 160° C. for 12 hours. Conductive carbon and binder were added in a weight ratio of POP-A-sulfur:Super P:PVDF of 50:35:15. The ratio of POP-A:sulfur was 1:1. FIG. 1 is a charge-discharge capacity profile of Cell A. It is contemplated that the decrease in charge capacity is due to insufficient mixing.

Figure 2:
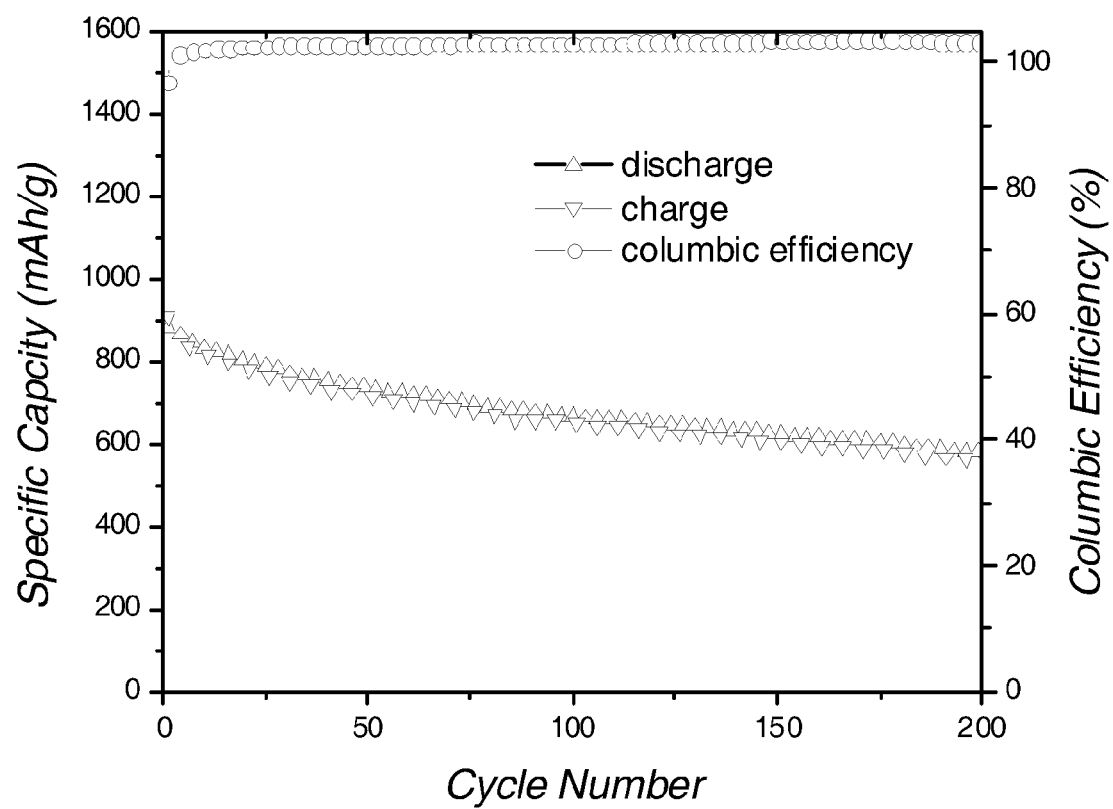
FIG. 2 is a dual axis graph of the specific capacity and columbic efficiency of Cell B, according to the examples.
Figure 3:
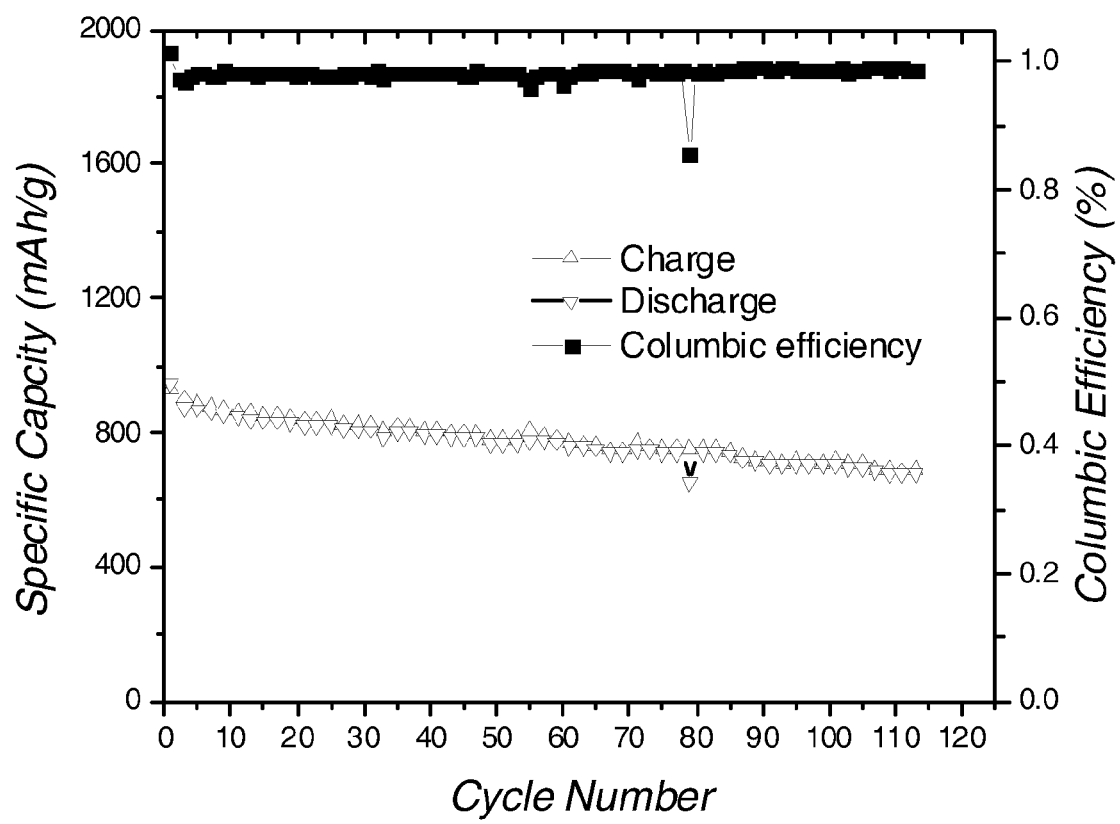
FIG. 3 is a dual axis graph of the specific capacity and columbic efficiency of Cell C as a function of cycle number, according to the examples.

Cell B: POP-A, sulfur, and Super P were homogenized by ball milling with $ZrO_2$ media for 48 h and heated to 160° C. for 12 hours. The ratio (by weight) of components were composite:Super P:PVDF=50:35:15. The ratio of POP-A:sulfur was 1:1. FIG. 2 illustrates a dual axis graph of the specific capacity and columbic efficiency of Cell B over a voltage range of 1.5-3.0V as a function of cycle number, according Cell C: POP-A and sulfur were homogenized by ball milling with $ZrO_2$ media for 48 h and heated to 160° C. for 12 hours. The ratio (by weight) of components were mixed as composite:Super P:PVDF at a ratio of 50:35:15. The ratio of POP-A:sulfur was 1:1. The Super P and binder were added during the laminate making process. FIG. 3 is a dual axis graph of the specific capacity and columbic efficiency of Cell C as a function of cycle number.

Figure 4:
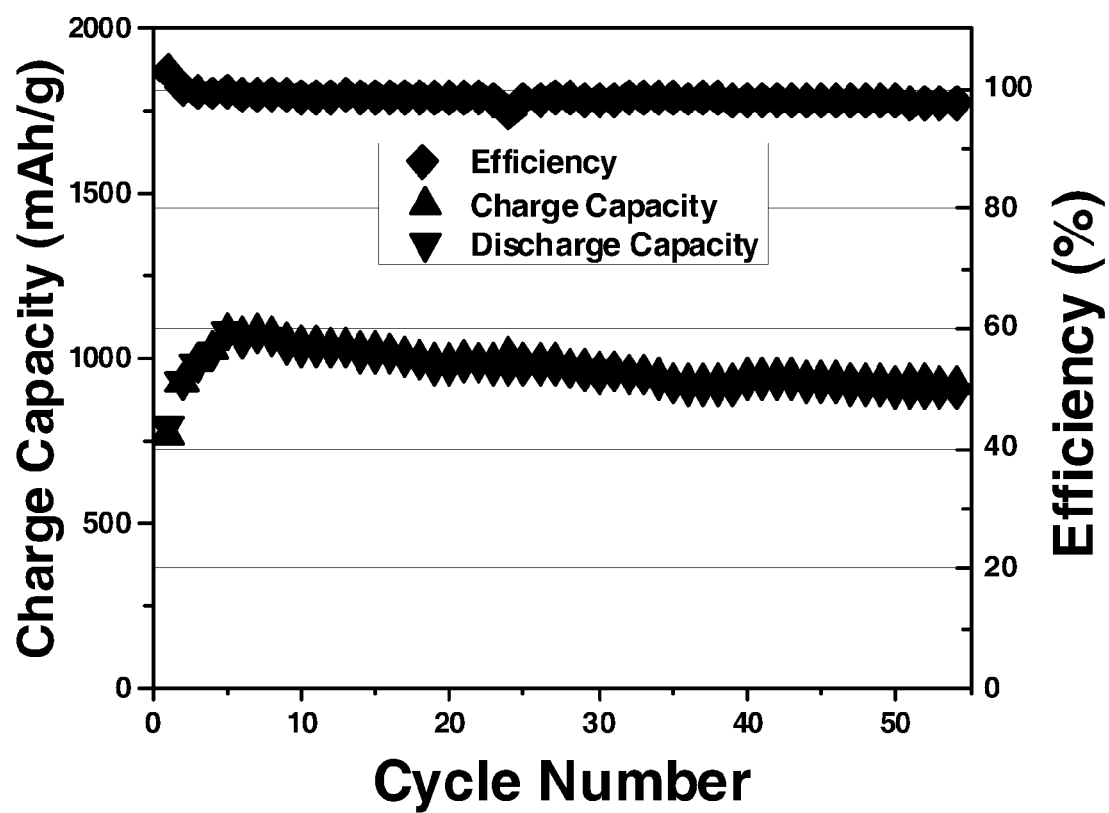
FIG. 4 is a dual axis graph of the specific capacity and columbic efficiency of Cell D as a function of cycle number, according to the examples.

Cell D: POP-A and sulfur were homogenized by ball milling with $ZrO_2$ media for 48 h and heated to 160° C. for 12 hours. The ratio of POP-A:sulfur was 1:2. The ratio (by weight) of components in the laminate were mixed as composite:Super P:PVDF at a ratio of 75:15:10. The Super P and binder were added during the laminate making process. FIG. 4 is a dual axis graph of the specific capacity and columbic efficiency of Cell D as a function of cycle number.

Figure 5:
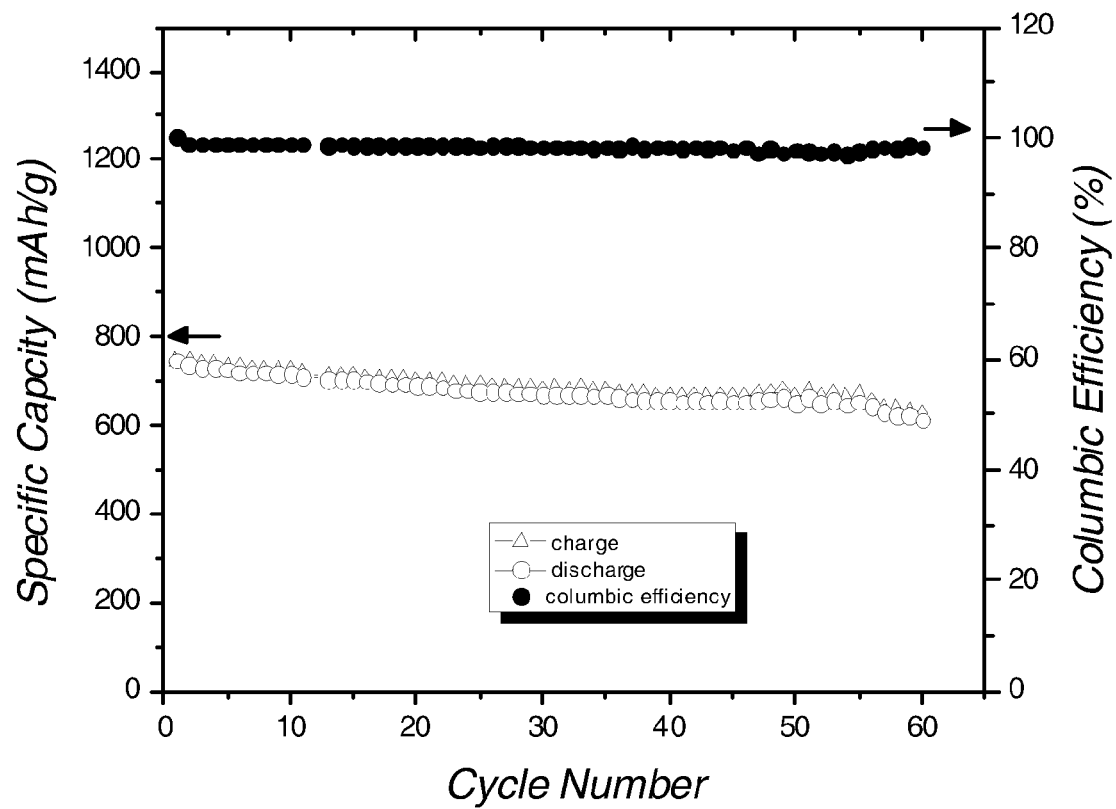
FIG. 5 is a voltammogram of Cell E, according to the examples.
Figure 6:
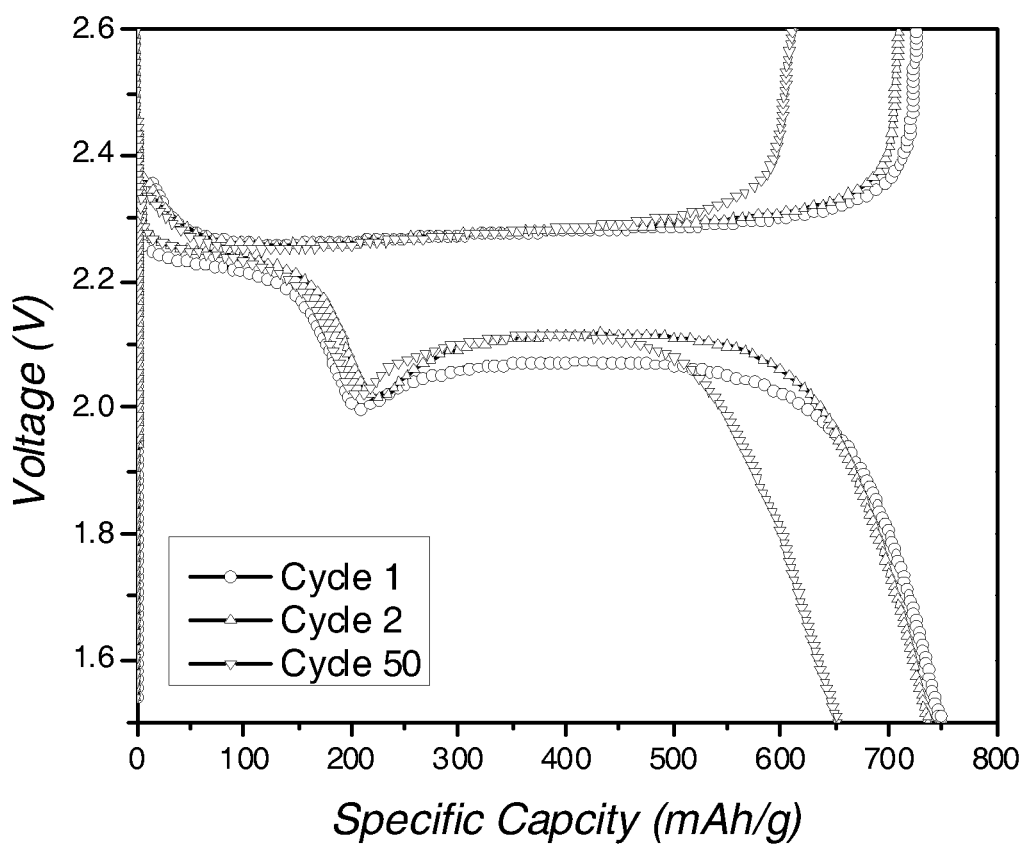
FIG. 6 is a voltammogram of Cell E for cycles 1, 2, and 50, according to the examples.

Cell E: POP-B and sulfur were homogenized by ball milling with $ZrO_2$ media for 48 h and heated to 160° C. for 12 hours. The ratio (by weight) of components were composite:Super P:PVDF at a ratio of 50:35:15. The ratio of POP-B:sulfur was 1:1. The Super P and binder were added during the laminate making process. FIG. 5 is a cyclic voltammogram of Cell E over a voltage range of 1.5-3.0V, and FIG. 6 is a voltammogram of Cell E for cycles 1, 2, and 50.

Figure 7:
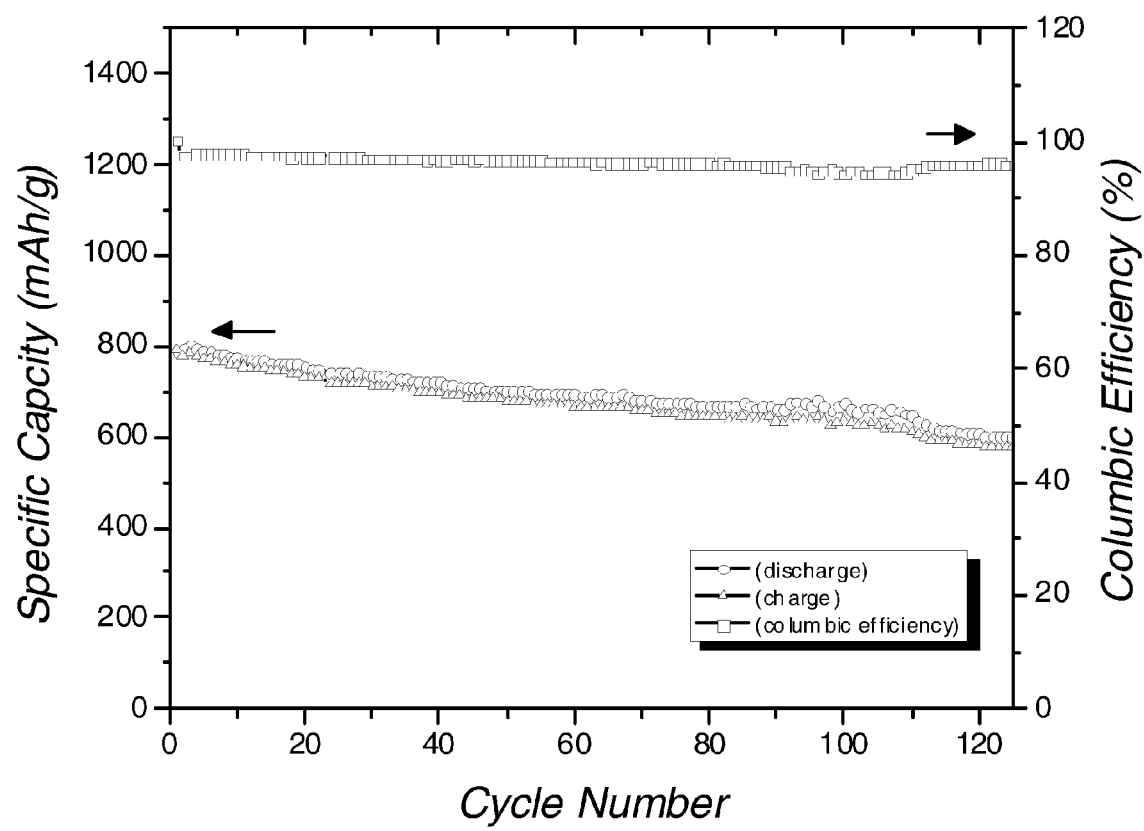
FIG. 7 is a voltammogram of Cell F, according to the examples.
Figure 8:
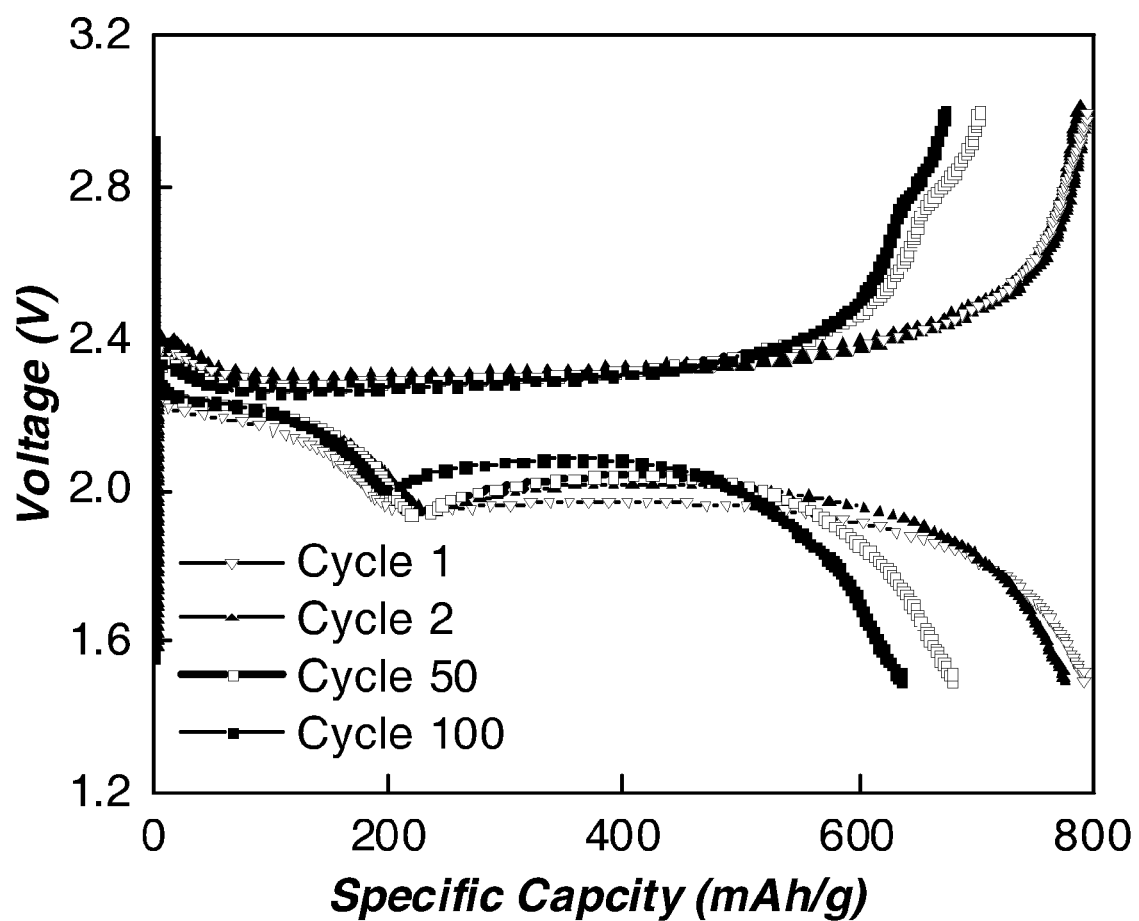
FIG. 8 is a voltammogram of Cell F for cycles 1, 2, 50 and 100, according to the examples.

Cell F: POP-C and sulfur were homogenized by ball milling with $ZrO_2$ media for 48 h and heated to 160° C. for 12 hours. The ratio (by weight) of components were composite: Super P:PVDF at a ratio of 50:35:15. The ratio of POP-C: sulfur was 1:1. The Super P and binder were added during the laminate making process. FIG. 7 is a voltammogram of Cell F over a voltage range of 1.5-3.0V, and FIG. 8 is a voltammogram of Cell F for cycles 1, 2, 50 and 100.

Figure 9:
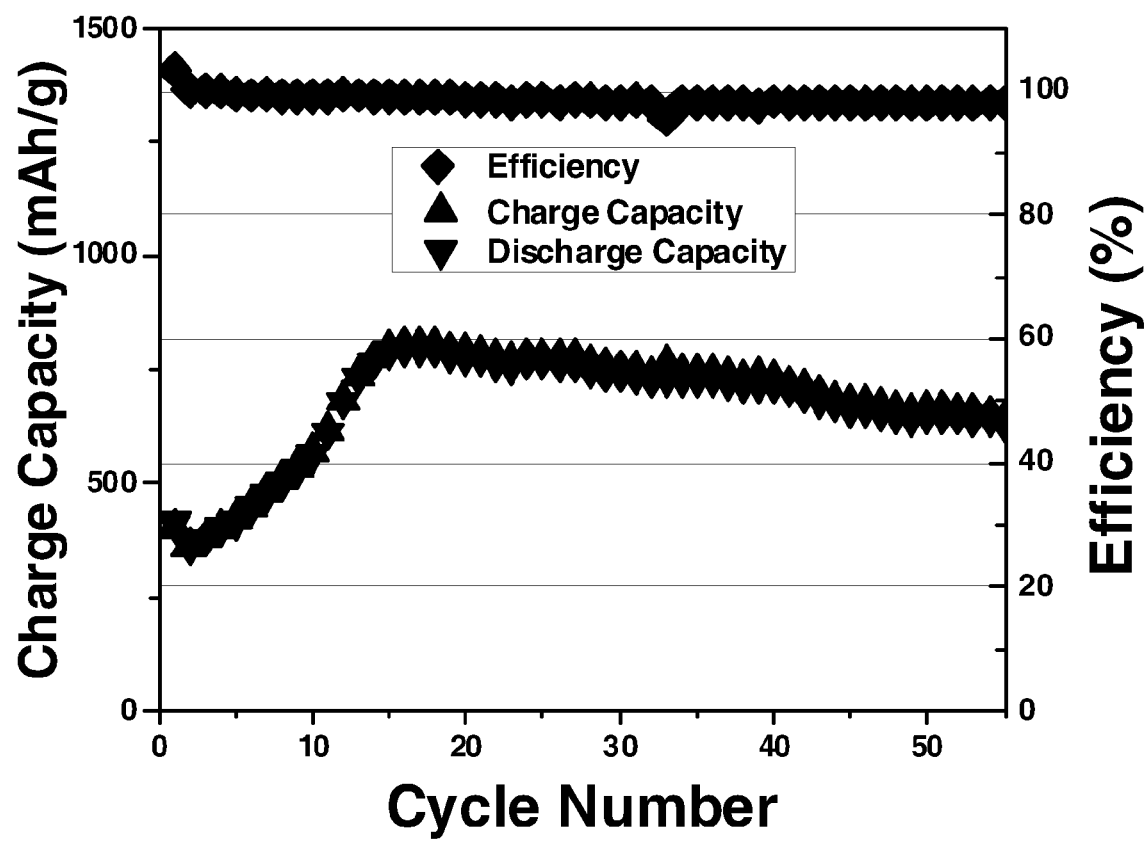
FIG. 9 is a dual axis graph of the specific capacity and columbic efficiency of Cell G as a function of cycle number, according to the examples.

Cell G: POP-A and sulfur (the ratio of POP-A:sulfur was 2:1) were homogenized by ball milling with $ZrO_2$ media for 48 h and heated to 160° C. for 12 hours. The ratio (by weight) of components were composite:Super P:PVDF at a ratio of 75:15:10. The Super P and binder were added during the laminate making process. The charge and discharge current was 200 mA/g. FIG. 9 is a dual axis graph of the specific capacity and columbic efficiency of Cell G as a function of cycle number.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential to the practice of the invention.

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A composite material comprising a porous organic polymer and an electrochemically active material, wherein the porous organic polymer contains a plurality of pores having a diameter of from about 0.1 nm to about 100 nm, and the electrochemically active material is disposed within the pores; wherein the porous organic polymer is represented as:

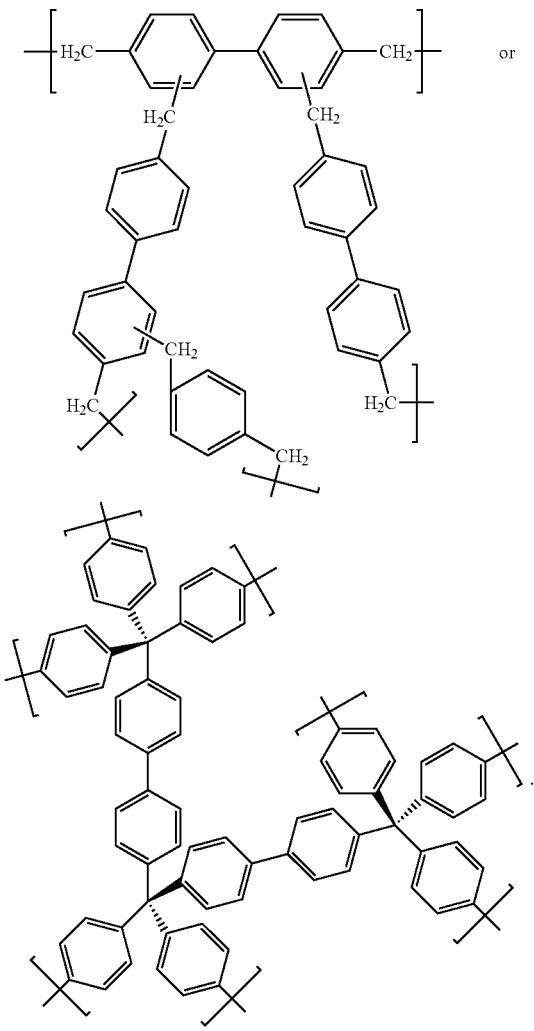

2. The composite material of claim 1, wherein the electrochemically active material is sulfur, selenium, tellurium, $Li_2S_x$ or $Li_2Se_x$.

3. The composite material of claim 1, wherein the pores have a diameter of from about 0.5 nm to about 2 nm.

4. The composite material of claim 1, wherein the electrochemically active material is present in from about 20 wt % to about 60 wt % of the composite material.

5. The composite material of claim 1, wherein the porous organic polymer is non-conductive.

6. An energy storage device comprising
a cathode comprising the composite material of claim 1,
an anode;
a separator; and
an electrolyte comprising a solvent and an alkali metal salt.

7. The device of claim 6, wherein the anode comprises lithium.

8. The device of claim 6, wherein the cathode farther comprises a conductive polymer.

9. The device of claim 8, wherein the conductive polymer comprises polyaniline, polypyrrole, poly(pyrrole-co-aniline), polyphenylene, polythiophene, polyacetylene, polysiloxane, or polyfluorene.

10. The device of claim 6, wherein the solvent comprises a fluorinated ether solvent, a cyclic ether, a siloxyl ether solvent, a silyl carbonate solvent, or a siloxyl carbonate solvent.

11. The device of claim 10, wherein the fluorinated ether solvent is represented by Formula I or II:

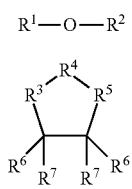

Formula I

Formula II wherein:
R¹ and R² are individually a $C_nH_xF_y$ group;
R³ and R⁵ are individually O or $CR^6R^7$;
R⁴ is O or C=O;
each R⁶ and R⁷ is individually H, F or a $C_nH_xF_y$ group;
each x is individually from 0 to 2n;
each y is individually from 1 to 2n+1; and
each n is individually an integer from 1 to 20,
with the proviso that at least one R⁶ or R⁷ is other than H, and R⁴ is not O when R³ or R⁵ is O.

12. The device of claim 11, wherein the fluorinated ether solvent is represented by Formula I, and R¹ and R² are individually $CF_2CF_3$; $CF_2CHF_2$; $CF_2CH_2F$; $CF_2CH_3$; $CF_2CF_2CF_3$; $CF_3CF_2CHF_2$; $CF_2CF_2CH_2F$; $CF_2CF_2CH_3$; $CF_2CF_2CF_2CF_3$; $CF_2CF_2CF_2CHF_2$; $CF_2CF_2CF_2CH_2F$; $CF_2CF_2CF_2CH_3$; $CF_2CF_2CF_2CF_2CF_3$; $CF_2CF_2CF_2CF_2CHF_2$; $CF_2CF_2CF_2CF_2CH_2F$; $CF_2CF_2CF_2CF_2CH_3$; or $CF_2CF_2OCF_3$.

13. The device of claim 11, wherein the fluorinated ether solvent is $CHF_2CF_2OCF_2CF_2H$; $CF_3CF_2OCF_2CF_3$; $CF_2CF_2CF_2OCF_2CF_2CF_3$; $CF_3CF_2CF_2CF_2OCF_2CF_2CF_2CF_3$; $CF_3OCF_2CF_2OCF_2CF_2CF_3$; $CF_3CF_2OCF_2CH_2F$;

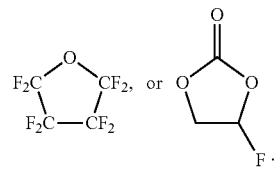

14. A method of preparing the composite material of claim 1, comprising heating a mixture of particles comparing an electrochemically active material and a porous organic polymer at a temperature suitable for depositing the electrochemically active material into pores in the porous organic polymer.

15. The method of claim 14, wherein the heating is performed under inert conditions which comprises He, Ar, or $N_2$.

16. The method of claim 14, wherein the heating s performed under reducing conditions which comprises an inert gas.

17. The method of claim 16, wherein the reducing conditions further comprises hydrogen at a concentration from about 0.1 vol % to about 5 vol % of an inert gas.

* * * * *

UNITED STATES PATENT AND TRADEMARK OFFICE
CERTIFICATE OF CORRECTION

Page 1 of 1

PATENT NO. : 9,257,699 B2
APPLICATION NO. : 13/788866
DATED : February 9, 2016
INVENTOR(S) : Zhengcheng Zhang et al.

It is certified that error appears in the above-identified patent and that said Letters Patent is hereby corrected as shown below:

Claims

In Claim 12, Column 22, Line 2, delete "$CF_3CF_2CHF_2$" and insert -- $CF_2CF_2CHF_2$ -- therefore.

In Claim 13, Column 22, Line 9, delete "$CF_2CF_2CF_2OCF_2CF_2CF_3$" and insert -- $CF_3CF_2CF_2OCF_2CF_2CF_3$ -- therefore.

In Claim 16, Column 22, Line 27, delete "heating s" and insert -- heating is -- therefore.

Signed and Sealed this
Tenth Day of May, 2016

Michelle K. Lee
*Director of the United States Patent and Trademark Office*